United States Patent [19]

Teeters

[11] 3,851,853
[45] Dec. 3, 1974

[54] VALVE

[75] Inventor: Wilbur O. Teeters, Tenafly, N.J.

[73] Assignee: Hoke Incorporated, Cresskill, N.J.

[22] Filed: Apr. 23, 1973

[21] Appl. No.: 353,441

[52] U.S. Cl................ 251/214, 251/267, 251/286, 251/330
[51] Int. Cl............................................. F16k 41/00
[58] Field of Search ........... 251/214, 218, 221, 222, 251/225, 267, 286, 284, 330; 277/9, 117, 190

[56] References Cited
UNITED STATES PATENTS

| 682,688 | 9/1901 | Hart............................... 251/267 X |
| 1,502,734 | 7/1924 | Martin................................ 251/214 |
| 2,194,262 | 3/1940 | Allen et al. ...................... 251/330 X |
| 2,309,338 | 1/1943 | Calaway............................. 251/284 |
| 3,237,917 | 3/1966 | Kunzer et al. ...................... 251/214 |
| 3,559,950 | 2/1971 | Nelson.............................. 251/214 |

*Primary Examiner*—Martin P. Schwadron
*Assistant Examiner*—David R. Matthews
*Attorney, Agent, or Firm*—Holland, Armstrong, Wilkie & Previto

[57] ABSTRACT

A fluid flow control valve is disclosed having an improved stem mounting and packing means. Fluid flow between spaced ports in the valve body is controlled by a stem which is adjustably mounted in the valve body by threaded engagement with a stem guide. The stem guide is received in sliding engagement within the valve body with the stem guide bottom engaging and loading a wafer stem packing. A threaded packing nut holds the sliding stem guide in place within the valve body and adjustably loads the wafer stem packing by forcing the stem guide downwardly against the packing. Rotation of the stem guide with respect to the valve body is prevented by a pin which engages an elongated slot in the stem guide.

12 Claims, 5 Drawing Figures

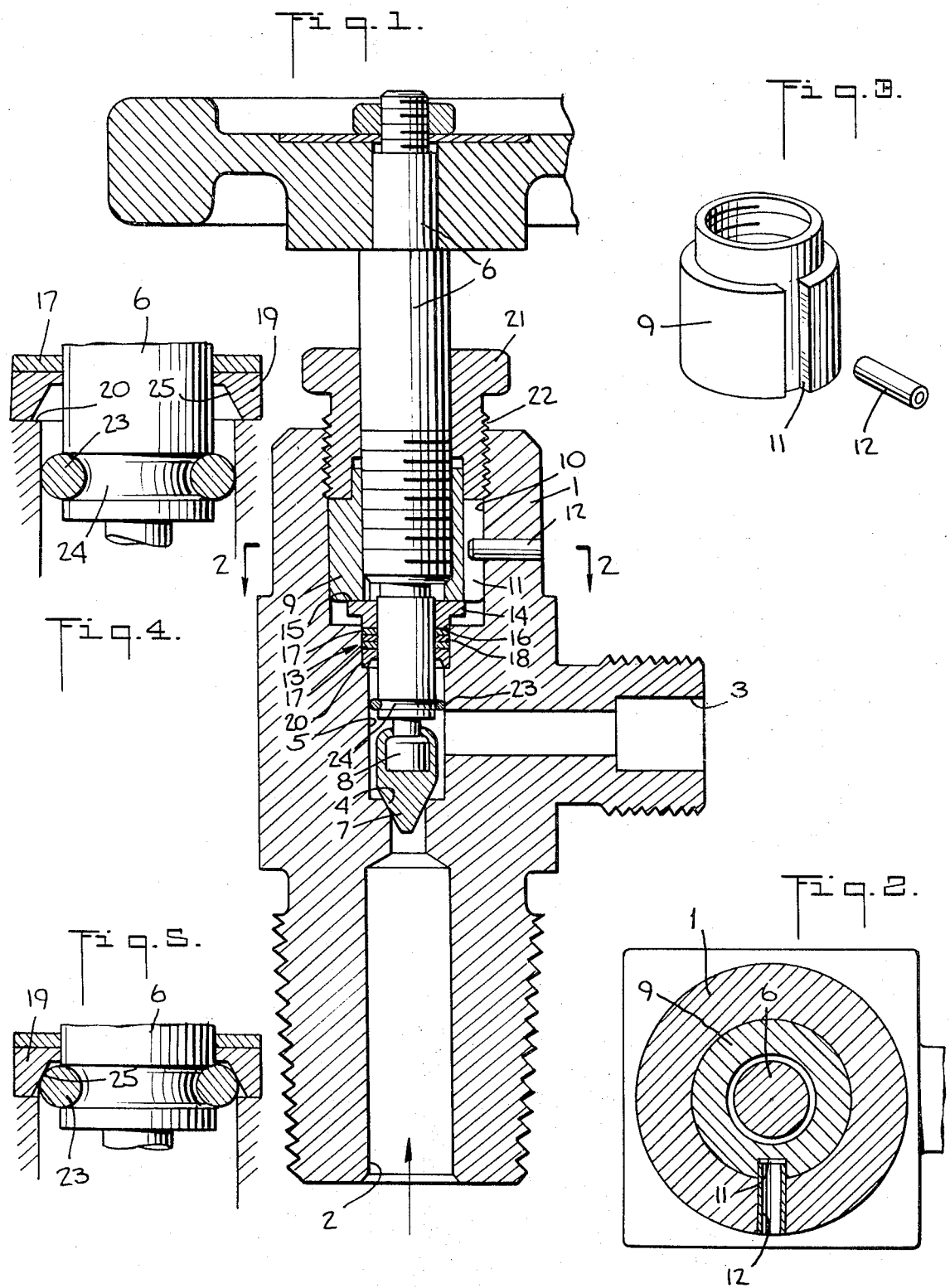

VALVE

BACKGROUND OF THE INVENTION

The present invention relates to a fluid control valve and more particularly to a control valve having an improved stem mounting including an adjustably loaded stem packing positioned between the controlled fluid and the stem threads.

In fluid control valves and particularly in precision high-pressure valves, there is a need for a stem support and packing arrangement which permits the packing to be positioned between the controlled fluid and the valve stem threads while also being both adjustably loadable and secure against unintentional stem detachment. The valve in accordance with the present invention provides a unique combination of an efficient adjustably loaded stem packing together with a stem support which is firmly anchored within the valve body and which may not be removed unintentionally therefrom.

This arrangement comprises a wafer-type packing surrounding the stem and loaded by a slidable stem guide which threadedly engages the stem and is held against rotation in the valve body by a removable pin. The packing is adjustably loaded through the sliding stem guide by an accessible threaded packing nut.

Accordingly, an object of the present invention is to provide an improved fluid control valve suitable for handling gas or liquid at high or low pressures.

Another object of the present invention is to provide an improved locked-in and adjustably loaded valve stem packing.

Another object of the present invention is to provide an improved wafer-type valve stem packing positioned between the controlled fluid and the valve stem threads and which is adjustably loadable.

Another object of the present invention is to provide an improved valve having a stem mounting with improved safety means for preventing unintentional stem removal.

Other and further objects of the invention will be obvious upon an understanding of the illustrative embodiment about to be described or will be indicated in the appended claims, and various advantages not referred to herein will occur to one skilled in the art upon employment of the invention in practice.

BRIEF DESCRIPTION OF THE DRAWING

A preferred embodiment of the invention has been chosen for purposes of illustration and description and is shown in the accompanying drawings, forming a part of the specification, wherein:

FIG. 1 is a vertical sectional view of the improved valve in accordance with the present invention.

FIG. 2 is a horizontal sectional view taken along line 2—2 on FIG. 1.

FIG. 3 is a detailed prospective view of the stem guide.

FIGS. 4 and 5 are enlarged fragmentary views of the valve stem split-ring retainer shown with the stem in its closed and opened positions, respectively.

DESCRIPTION OF THE PREFERRED EMBODIMENT

A one-piece valve body 1 is illustrated with an inlet port 2 coupled to an outlet port 3 through a valve seat 4 in a chamber 5. The flow of the controlled fluid between the ports 2 and 3 and through the valve seat 4 is controlled by the threaded valve stem 6. A conical point 7 is rotatably mounted on a suitable flange 8 at the bottom of the valve stem 6.

The valve stem 6 is threadedly coupled for movement within the valve body 1 within an internally threaded stem guide 9. The stem guide 9 is slidably received in a cavity 10 in the valve body 1. The stem guide 9 includes an elongated slot 11 which is engaged by a removable pin 12. This arrangement permits the stem guide 9 to slide axially of the valve body 1. The lower surface 12 of the stem guide 9 engages and adjustably loads a packing 13 for the valve stem 6.

The packing 13 preferably comprises an upper spacer member 14 whose top 15 engages the stem guide 9 and whose bottom 16 engages a packing wafer 17 such as a Teflon ring. A plurality of the wafers 17 are preferably used which are spaced from one another by steel spacers 18. A retainer 19 is positioned at the bottom of the stack of wafers 17 and spacers 18 which is seated on a ledge 20. The packing 13 is loaded to the desired degree to form a seal by a packing nut 21 which is threadably coupled at 22 to the top of the valve body 1. Rotation of the packing nut 21 forces the stem guide 9 downwardly thereby locking it in position and simultaneously loading the above-described packing 13.

A split-ring retainer 23 is positioned in a groove 24 in the valve stem 6 above the point 7. The ring retainer 23 determines the uppermost position of the valve stem 6 when the valve is fully open.

FIGS. 4 and 5 illustrate a self-locking feature for the retaining ring 23. This feature is obtained by forming the retainer 19 with a downwardly flared conical surface 25. When the retaining ring 23 reaches its uppermost position, as seen in FIG. 5, the conical surface 25 has an inwardly camming effect holding the retaining split ring 23 tightly in position in the stem groove 24. In its uppermost position, the retaining ring 23 also tends to increase the packing loading thereby assuring a tight stem seal even in the fully opened valve position.

The stem guide 9 functions both to align the stem 6 and to provide the threaded stem advancing threaded coupling. By being constrained against rotation by the pin 12, the stem guide 9 is held against rotation either due to normal stem 6 rotation or due to an upward and turning force resulting from the valve stem 6 being turned after it reaches its normal fully open position. The stem guide 9, therefore, cannot itself rotate and it also isolates the packing nut 21 from any torque forces applied by the valve stem. An unintentional disassembly or loosening of the stem 6 is prevented even though the valve is subjected to faulty operation by inexperienced personnel.

In addition to the above protective and packing nut isolating functions, the stem guide 9 also, through its slidable mounting within the valve body 1 and its engagement with the upper spacer 14, permits the above-described stem packing loading action to be easily accomplished. The combination of the sliding stem guide 9 with the axially compressible wafer packing 13 provides an improved adjustable stem packing and an adjustable packing loading which is externally accessible and which may be adjusted with the valve in use.

It will be seen that an improved fluid control valve is provided having an improved stem packing and stem mounting arrangement. The mounting arrangement simultaneously permits an adjustment of the packing loading while also preventing unintentional or accidental disassembly of the valve. The stem mounting and packing loading arrangement also provides for external adjustment of the packing loading even while the valve is in use and is coupled into a fluid distribution system.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

I claim:

1. In a fluid control valve having a body with spaced inlet and outlet ports coupled by a conduit including a valve stem seat and having a stem mounting cavity communicating with said conduit an improved valve stem assembly comprising:
   a stem with a sealing means for engaging said seat at the inner end of said stem and control threads on a portion of said stem intermediate its inner and outer ends,
   a stem guide slidably positioned in said stem mounting cavity and having a threaded aperture engaging the threaded portion of said stem,
   means on said guide for preventing relative rotation of said guide in said body,
   a stem packing positioned between said guide and said body inwardly of the stem control threads and in sealing engagement with said stem, and
   a packing nut threadedly coupled to said body and having an exposed tool engaging portion outwardly of said body and holding said stem guide in said body and urging said stem guide against said packing thereby compressing said packing into sealing engagement with said stem.

2. A control valve as claimed in claim 1 in which said stem packing comprises a spacer member engaging said stem guide and a retainer engaging said valve body, a packing ring positioned between and compressed by said spacer and said retainer.

3. A control valve as claimed in claim 2 which further comprises a retainer ring mounted in a groove on said stem adjacent to the stem sealing means, and said retainer having a downwardly and outwardly flared surface facing said retainer ring.

4. A control valve as claimed in claim 1 in which said stem packing comprises a spacer member engaging said stem guide and a retainer engaging said valve body, a plurality of packing rings positioned between and compressed by said spacer and said retainer, and a spacer between adjacent packing rings.

5. The control valve as claimed in claim 4 in which said packing rings comprise Teflon and said spacer comprises a relatively harder material.

6. A control valve as claimed in claim 1 in which the means for preventing relative rotation of said stem guide in said body comprises an elongated slot in said guide, and a pin mounted in said body and projecting into said slot.

7. A control valve as claimed in claim 1 in which said stem sealing means comprises a conical point rotatably mounted on said stem.

8. In a fluid control valve having a body with spaced inlet and outlet ports coupled by a conduit including a valve stem seat and having a stem mounting cavity communicating with said conduit an improved valve stem assembly comprising:
   a stem with a sealing means for engaging said seat at the inner end of said stem and control threads on a portion intermediate its inner and outer ends,
   a stem guide slidably positioned in said stem mounting cavity and having a threaded aperture engaging the threaded portion of said stem,
   means on said guide for preventing relative rotation of said guide in said body,
   a stem packing positioned between said guide and said body and in sealing engagement with said stem,
   said stem packing positioned inwardly of the stem control threads comprising a circular spacer member surrounding said stem and engaging said stem guide and a retainer surrounding said stem and engaging said valve body and a plurality of packing rings positioned between and compressed by said spacer and said retainer, and spacer rings positioned between adjacent packing rings formed of a harder material than said packing rings, and
   a packing nut threadedly coupled to said body and having an exposed tool engaging portion outwardly of said body and holding said stem guide in said body and urging said stem guide against said packing thereby compressing said packing into sealing engagement with said stem.

9. A control valve as claimed in claim 8 which further comprises a ring retainer mounted in a groove on said stem adjacent to the stem sealing means, and said retainer having a downwardly and outwardly flared surface facing said ring retainer.

10. A control valve as claimed in claim 8 in which the means for preventing relative rotation of said stem guide in said body comprises an elongated slot in said guide and a pin mounted in said body and projecting into said slot.

11. A control valve as claimed in claim 8 in which said stem sealing means comprises a conical point rotatably mounted on said stem.

12. A control valve as claimed in claim 8 in which said packing rings comprise Teflon.

* * * * *